(12) United States Patent
Ugarte et al.

(10) Patent No.: US 12,059,726 B2
(45) Date of Patent: Aug. 13, 2024

(54) SYSTEMS AND METHODS FOR ESTIMATING POWDER DOSING IN ADDITIVE MANUFACTURING PROCESSES

(71) Applicant: General Electric Company, Schenectady, NY (US)

(72) Inventors: Johnnattan Tennessee Ugarte, Mason, OH (US); Joanna Mechelle Jayawickrema, Mason, OH (US); Xuefeng Zhang, Deerfield Township, OH (US); Jun Zheng Hu, Cincinnati, OH (US); Kishore Vetcha, Bangalore (IN); Veeraraju Vanapalli, Bangalore (IN); Andrew Jean Desrosiers, Cincinnati, OH (US); Ruben Egberto Fairman, Forest Park, OH (US); Ryan Antony Lozier, Hamilton Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/193,198

(22) Filed: Mar. 30, 2023

(65) Prior Publication Data

US 2023/0256511 A1 Aug. 17, 2023

Related U.S. Application Data

(62) Division of application No. 17/011,325, filed on Sep. 3, 2020, now Pat. No. 11,638,959.

(51) Int. Cl.
*B22F 10/00* (2021.01)
*B22F 10/10* (2021.01)
(Continued)

(52) U.S. Cl.
CPC .............. *B22F 10/00* (2021.01); *B33Y 10/00* (2014.12); *B33Y 30/00* (2014.12); *B33Y 40/00* (2014.12);
(Continued)

(58) Field of Classification Search
CPC .......... B22F 10/00; B22F 10/10; B22F 10/85; B22F 2999/00; B22F 12/57; B22F 10/28;
(Continued)

(56) References Cited

U.S. PATENT DOCUMENTS 7,045,738 B1 5/2006 Kovacevic et al.
10,414,149 B2 9/2019 Mummidi et al.
(Continued)

FOREIGN PATENT DOCUMENTS

CN 106232330 A 12/2016
CN 106457393 A1 2/2017
(Continued)

OTHER PUBLICATIONS

European Patent Office Action for Application No. 21190607.8 dated Oct. 10, 2023 (6 pages).
(Continued)

*Primary Examiner* — Lawrence Averick
(74) *Attorney, Agent, or Firm* — Dinsmore & Shohl LLP

(57) ABSTRACT

A method for forming a component includes estimating a dosing plan for powder of a powder bed fusion (PBF) system needed to form the component. The dosing plan includes powder dosing requirements needed per layer to form the component. The method includes providing the dosing plan to a controller of the PBF system. Further, the method includes regulating the powder being supplied to a build chamber of the PBF system from a supply chamber of the PBF system based on the dosing plan. In addition, the
(Continued)

method includes additively manufacturing the component via the PBF system using the powder.

20 Claims, 6 Drawing Sheets

(51) Int. Cl.
*B33Y 10/00* (2015.01)
*B33Y 30/00* (2015.01)
*B33Y 40/00* (2020.01)
*B33Y 50/02* (2015.01)
*B33Y 70/00* (2020.01)
*B33Y 80/00* (2015.01)

(52) U.S. Cl.
CPC .............. *B33Y 50/02* (2014.12); *B33Y 70/00* (2014.12); *B33Y 80/00* (2014.12); *B22F 10/10* (2021.01)

(58) Field of Classification Search
CPC .......... B22F 12/40; B22F 12/50; B22F 12/90; B33Y 10/00; B33Y 30/00; B33Y 40/00; B33Y 50/02; B33Y 70/00; B33Y 80/00; Y02P 10/25; B29C 64/153; B29C 64/343; B29C 64/393
See application file for complete search history.

(56) References Cited

U.S. PATENT DOCUMENTS

| | | | |
|---|---|---|---|
| 11,396,046 B2 | 7/2022 | Ugarte et al. | |
| 2007/0235558 A1 | 10/2007 | Ballu et al. | |
| 2013/0066812 A1* | 3/2013 | Nehme | B29C 64/40 700/106 |
| 2018/0111335 A1 | 4/2018 | Mummidi et al. | |
| 2018/0222112 A1* | 8/2018 | Danzig | B29C 64/343 |
| 2018/0281285 A1 | 10/2018 | Morovic et al. | |
| 2019/0070787 A1 | 3/2019 | Higgs, III et al. | |
| 2019/0105837 A1 | 4/2019 | Zehavi et al. | |
| 2019/0232370 A1 | 8/2019 | Bokkes | |
| 2020/0016838 A1* | 1/2020 | McMurtry | B22F 10/28 |
| 2020/0247059 A1 | 8/2020 | Frohnmaier et al. | |
| 2020/0254520 A1* | 8/2020 | Ugarte | B29C 64/194 |
| 2020/0269510 A1 | 8/2020 | Nicaise et al. | |
| 2021/0205928 A1* | 7/2021 | Beeby | B23K 26/144 |
| 2021/0311466 A1* | 10/2021 | Yang | B29C 64/393 |
| 2021/0316369 A1* | 10/2021 | Kemakolam | B22F 12/17 |

FOREIGN PATENT DOCUMENTS

| | | | | |
|---|---|---|---|---|
| CN | 107428081 A1 | 12/2017 | | |
| CN | 108788143 A | 11/2018 | | |
| CN | 110560691 A | 12/2019 | | |
| DE | 102015223719 A1 | 6/2017 | | |
| EP | 3473360 A1 * | 4/2019 | ............. | B22F 10/28 |
| EP | 3473360 B1 * | 8/2022 | ............. | B22F 10/28 |
| EP | 3473360 B1 | 8/2022 | | |
| GB | 2378150 A | 2/2003 | | |
| JP | 2016155257 A | 9/2016 | | |
| JP | 2018528875 A | 10/2018 | | |
| JP | 2019501293 A | 1/2019 | | |
| JP | 2019130883 A | 8/2019 | | |
| WO | 2017009249 A2 | 1/2017 | | |
| WO | 2018110838 A1 | 6/2018 | | |
| WO | 2019074107 A1 | 4/2019 | | |
| WO | 2020026306 A1 | 2/2020 | | |
| WO | 2020028979 A | 2/2020 | | |

OTHER PUBLICATIONS

L. Yang: "Ch. 2—Additive Manufacturing Process Chain" In: "Additive Manufacturing of Metals: The Technology, Materials, Design and Production", May 13, 2017 (May 13, 2017), Springer International Publishing, XP055506460, ISBN: 978-3-319-55128-9_2.

Extended European Search Report for EP Patent Application No. 211906073.8 dated Jan. 26, 2022.

Japanese Patent Office Action for Application No. 2021-143446 dated Sep. 13, 2022 (3 pages).

Chinese Patent Office Action for Application No. 202111035361.6 dated Sep. 27, 2023 (21 pages with English Translation).

* cited by examiner

RECOATER DIRECTION

SYSTEMS AND METHODS FOR ESTIMATING POWDER DOSING IN ADDITIVE MANUFACTURING PROCESSES

CROSS-REFERENCE TO RELATED APPLICATIONS

The present specification is a divisional of U.S. Nonprovisional application Ser. No. 17/011,325 filed Sep. 3, 2020 and entitled "Systems and Methods for Estimating Powder Dosing in Additive Manufacturing Processes," the entirety of which is incorporated by reference herein

FIELD

The present disclosure relates generally to additive manufacturing and more particularly to systems and methods for estimating powder dosing for additive manufacturing processes, such as direct metal laser melting (DMLM) systems.

BACKGROUND

When fabricating a component using an additive manufacturing system such as a powder bed fusion (PBF) system, support structures may be utilized to anchor the component to a build platform and provide a thermally conductive pathway for heat to dissipate from the component. As examples, PBF systems include direct metal laser melting (DMLM) systems, electron beam melting (EBM) systems, selective laser melting (SLM) systems, directed metal laser sintering (DMLS) systems, and selective laser sintering (SLS) systems. These PBF systems involve focusing an energy beam onto a bed of powder to melt or sinter sequential layers of powder to one another to form a component.

Typical PBF systems include a supply chamber, a build chamber, and an overflow collector. Thus, powder is provided in the supply chamber based on the component to be printed. The supply chamber also generally includes a piston which elevates a powder floor during operation of the system. As the floor elevates, a portion of the powder is forced out of the supply chamber and into the build chamber. A recoater, such as a roller or a blade, pushes some of the powder onto a build platform. The recoater sequentially distributes thin layers of powder onto the build platform. An energy source directs an energy beam such as a laser or an electron beam onto the thin layer of powder to melt or fuse the sequential layers of powder. Typically with a DMLM, EBM, or SLM system, the powder is fully melted, with respective layers being melted or re-melted with respective passes of the energy beam. Conversely, with DMLS, or SLS systems, layers of powder are sintered, fusing particles of powder with one another generally without reaching the melting point of the powder.

For conventional PBF systems, the system does not regulate the powder being added to the build chamber. Further, in such systems, required powder dosing varies from layer to layer as a function of cross-sectional area, part perimeter, material properties, and laser scan parameters. Current methods for powder dosing, however, rely on user observation, and dosing regulation as the build progresses— for tall or complicated builds. However, high dosing of the powder produces waste in the overflow collector and can result in running out of powder before build is complete. In aviation applications, where the powder material is controlled and regulated, the wasted powder in the overflow collector cannot be reused. Alternatively, low dosing can result in short feeds, part defects, and/or build crashes. Accordingly, for conventional methods, overdosing is the preferred method to prevent short feeds.

Accordingly, there exists a need for improved systems and methods for estimating powder dosing in additive manufacturing processes, such as DMLM systems, to eliminate waste and the need for manual operator intervention.

BRIEF DESCRIPTION

Aspects and advantages will be set forth in part in the following description, or may be obvious from the description, or may be learned through practicing the presently disclosed subject matter.

In one aspect, the present disclosure is directed to a method for forming a component, such as an aircraft component. The method includes estimating a dosing plan for powder of a powder bed fusion (PBF) system (such as a direct metal laser melting (DMLM) system) needed to form the component. The dosing plan includes powder dosing requirements needed per layer to form the component. The method includes providing the dosing plan to a controller of the PBF system. Further, the method includes regulating the powder being supplied to a build chamber of the PBF system from a supply chamber of the PBF system based on the dosing plan. In addition, the method includes additively manufacturing the component onto a build platform via the PBF system using the powder in the build chamber.

In another aspect, the present disclosure is directed to a powder bed fusion (PBF) system for forming a component. The PBF system includes a build chamber having a build platform, a recoater, a supply chamber configured to receive an amount of powder based on the component to be formed, an energy source, and a controller. The supply chamber includes a supply platform, such that, as the supply platform elevates, the powder is forced out of the supply chamber layer-by-layer and into the build chamber atop the build platform via the recoater. The energy source includes an energy beam that is directed onto the powder in the build chamber to melt or fuse sequential layers of powder together to form the component. Further, the controller is configured to regulate the powder being supplied to the build chamber from the supply chamber of the PBF system based on a predetermined dosing plan stored therein, the dosing plan comprising powder dosing requirements needed per layer to form the component.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

DETAILED DESCRIPTION

Figure 1:
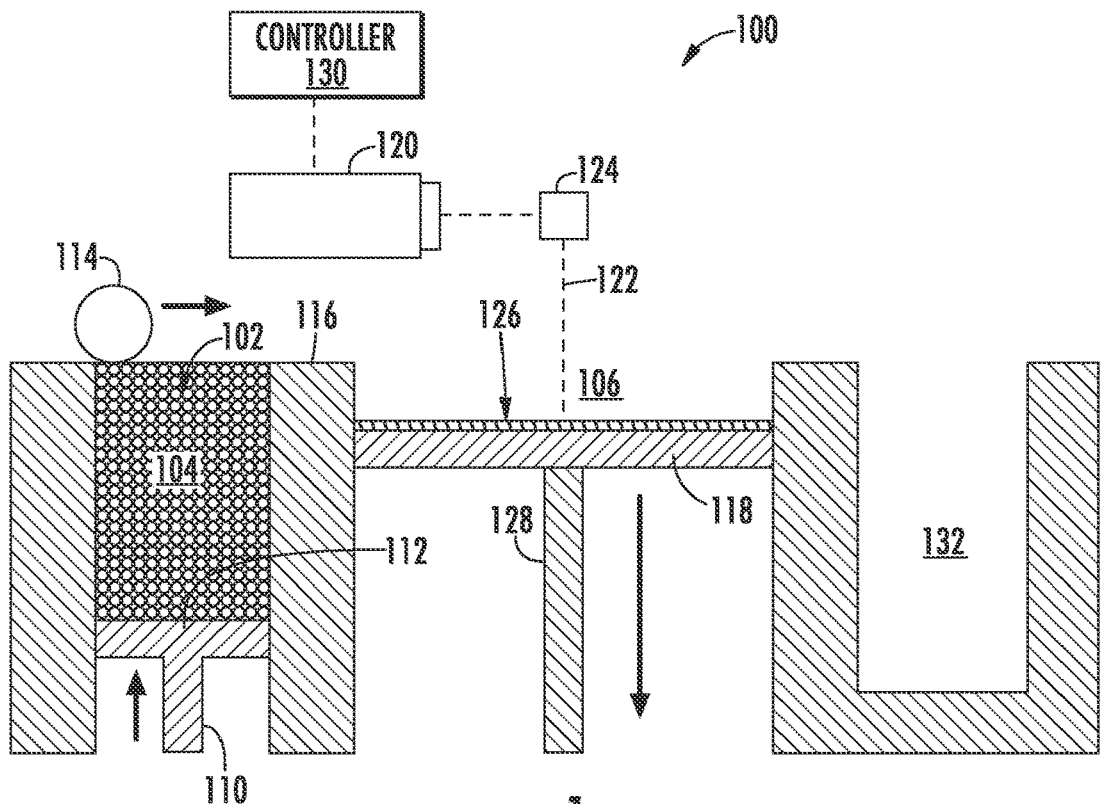
FIG. 1 illustrates a cross-sectional view of one embodiment of an additive manufacturing system according to the present disclosure.

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Generally, the present disclosure is directed to a method for estimating powder dosing/use needs on a layerwise basis for an additive manufacturing system and/or adjusting powder dosing layerwise based on that estimation. Accordingly, the present disclosure is more reliable than prior art systems that relied on user observation and dosing regulation as the build progresses. Thus, the methods of the preset disclosure can predict, reduce, and ultimately eliminate the need for manual operator intervention. As such, the powder required to build a particular part can be better managed, thereby extending the use of the powder and build height capability. Moreover, scrap builds (due to lack of powder to complete the build) are reduced and/or eliminated.

Figure 2:
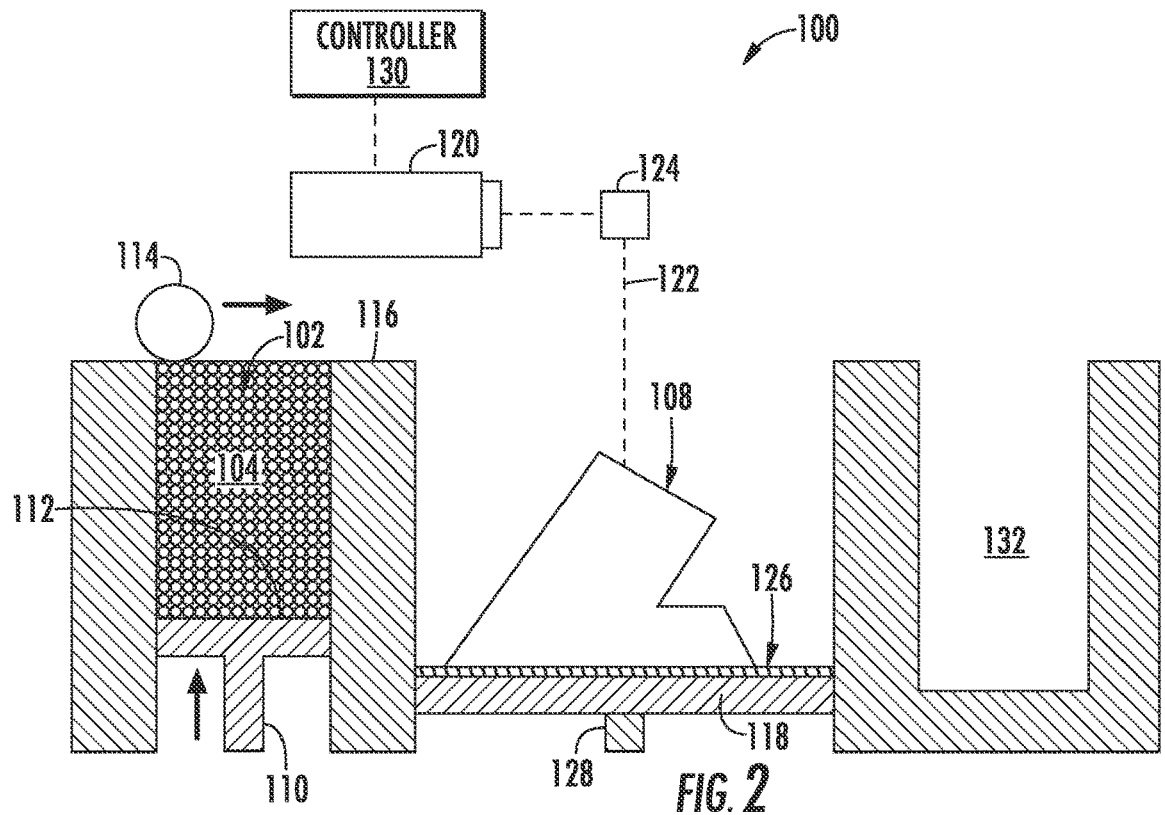
FIG. 2 illustrates a cross-sectional view of on embodiment of the additive manufacturing system of FIG. 1 as the component is being built.

Referring now to the drawings, FIGS. 1 and 2 illustrate a schematic diagram of one embodiment of an additive manufacturing system 100 according the present disclosure. The additive manufacturing system 100 may include, for example, a powder bed fusion (PBF) system, such as a direct metal laser melting (DMLM) system, an electron beam melting (EBM) system, a selective laser melting (SLM) system, a directed metal laser sintering (DMLS) system, or a selective laser sintering (SLS) system. As such, the additive manufacturing system 100 builds components in a layer-by-layer manner by melting or fusing sequential layers of a powder material to one another. More specifically, in an embodiment, the illustrated additive manufacturing system 100 includes a powder supply chamber 102 that contains a supply of powder material 104, and a build chamber 106 within which a component 108 may be additively manufactured in a layer-by-layer manner. In certain embodiments, the component 108 may be an aircraft component. For example, the component 108 may be a component of a gas turbine engine. By way of further example, the component 108 may be an airfoil separator or a heat exchanger for a gas turbine engine. In other embodiments, the component 108 may be any suitable part that can benefit from additive manufacturing technology.

In additional embodiments, the powder material 104 may include a metal or metal alloy, a plastic, a ceramic, and/or a composite. As examples, a metal or metal alloy powder may include tungsten, aluminum, chromium, copper, cobalt, molybdenum, tantalum, titanium, nickel, and steel, and combinations thereof, as well as super alloys, such as austenitic nickel-chromium-based super alloys.

The powder supply chamber 102 includes a powder piston 110 that elevates a powder floor 112 during operation of the system 100. As the powder floor 112 elevates, a portion of the powder 104 is forced out of the powder supply chamber 102. A recoater 114 such as a roller or a blade pushes some of the powder 104 across a work surface 116 and onto a build platform 118. The recoater 114 sequentially distributes thin layers of powder 104 onto the build platform 118. An energy source 120 directs an energy beam 122 such as a laser or an electron beam onto the thin layer of powder 104 to melt or fuse the sequential layers of powder 104. Typically with a DMLM, EBM, or SLM system, the powder 104 is fully melted, with respective layers being melted or re-melted with respective passes of the energy beam 122. Conversely, with DMLS, or SLS systems, layers of powder 104 are sintered, fusing particles of powder 104 with one another generally without reaching the melting point of the powder 104.

The energy source 120 may be controlled via a controller 130 for controlling the various components of the system 100. For example, a scanner 124 may be communicatively coupled with the controller 130 for controlling the path of the beam to melt or fuse only the portions of the layer of powder 104 that are to become part of the component 108. The first layer or series of layers of powder 104 are typically melted or fused to the build platform 118, and then sequential layers of powder 104 are melted or fused to one another to additively manufacture the component 108. The first several layers of powder 104 that become melted or fused to the build platform 118 define a support structure 126 for the component 108. As sequential layers of powder 104 are melted or fused to one another, as shown in FIG. 1, a build piston 128 gradually lowers the build platform 118 to make room for the recoater 114 to distribute sequential layers of powder 104. Sequential layers of powder 104 may be melted or fused to the component 108 until a completed component 108 has been fabricated (as shown in FIG. 2).

The support structure 126 generally provides a surface to which sequential layers of powder 104 may be melted or fused, while holding the sequential layers of melted or fused powder in position while resisting residual stresses caused by rapid changes in temperature as the energy beam 122 melts or fuses the sequential layers of powder 104. The support structure 126 also provides a thermally conductive pathway to dissipate heat generated by the energy beam 122. Typically, a support structure 126 may be fabricated in the same manner as the component 108. In some embodiments, the same powder 104 may be used to fabricate the support structure 126 and the component 108. Alternatively, in some embodiments, a different powder 104 may be used for the support structure 126 and the component 108. When forming the support structure 126, the energy beam 122 typically melts or sinters the top surface of the build platform 118 together with the first few layers of powder 104 to securely weld (e.g., melt or fuse) the support structure 126 to the build platform 118. After the component 108 has been fabricated, the support structure 126 may be removed from the component 108 in post-fabrication processes.

Still referring to FIG. 1, the PBF system 100 may also include an overflow collector 132 for collecting excess powder from the build chamber 106. In such embodiments, the recoater 114 is moveable across the supply chamber 102, the build chamber 106, and the overflow collector 132 to move the excess powder to the overflow collector 132.

The controller 130 may be further configured to regulate the powder 104 being supplied to the build chamber 106 from the supply chamber 102 of the PBF system 100 based on a predetermined dosing plan stored therein, which will be discussed in more detail herein. As such, the controller 130 may be communicatively coupled to any of the components of the system 100 in order to control the operation of such components. As such, the controller 130 may include a computer or other suitable processing unit. Thus, in several embodiments, the controller 130 may include suitable computer-readable instructions that, when implemented, configure the controller 130 to perform various different functions, such as receiving, transmitting and/or executing control signals.

Figure 3:
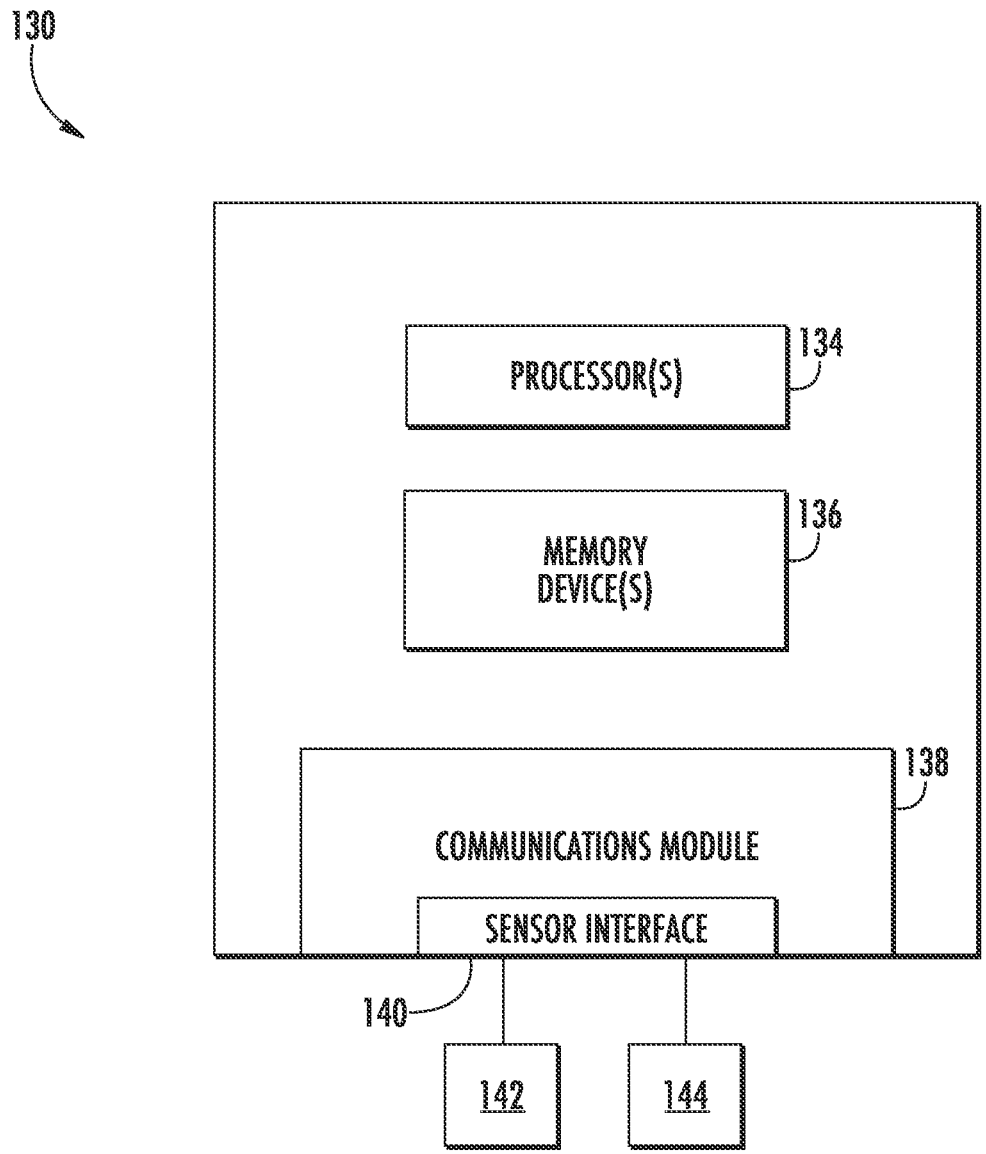
FIG. 3 illustrates a block diagram of one embodiment of suitable components that may be included in a controller of an additive manufacturing system according to the present disclosure.

Referring now to FIG. 3, a block diagram of one embodiment of suitable components that may be included within the controller 130 is illustrated in accordance with aspects of the present subject matter. As shown, the controller 130 may include one or more processor(s) 134 and associated memory device(s) 136 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 136 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Additionally, the controller 130 may also include a communications module 138 to facilitate communications between the controller 130 and the various components of the system 100.

For instance, the communications module 138 may include a sensor interface 140 (e.g., one or more analog-to-digital converters) to permit the signals transmitted by one or more sensors 142, 144 to be converted into signals that can be understood and processed by the controller 130. It should be appreciated that the sensors 142, 144 may be communicatively coupled to the communications module 138 using any suitable means. For example, as shown in FIG. 3, the sensors 142, 144 are coupled to the sensor interface 138 via a wired connection. However, in other embodiments, the sensors 142, 144 may be coupled to the sensor interface 64 via a wireless connection, such as by using any suitable wireless communications protocol known in the art. As such, the processor 134 may be configured to receive one or more signals from the sensors 142, 144.

Figure 4:
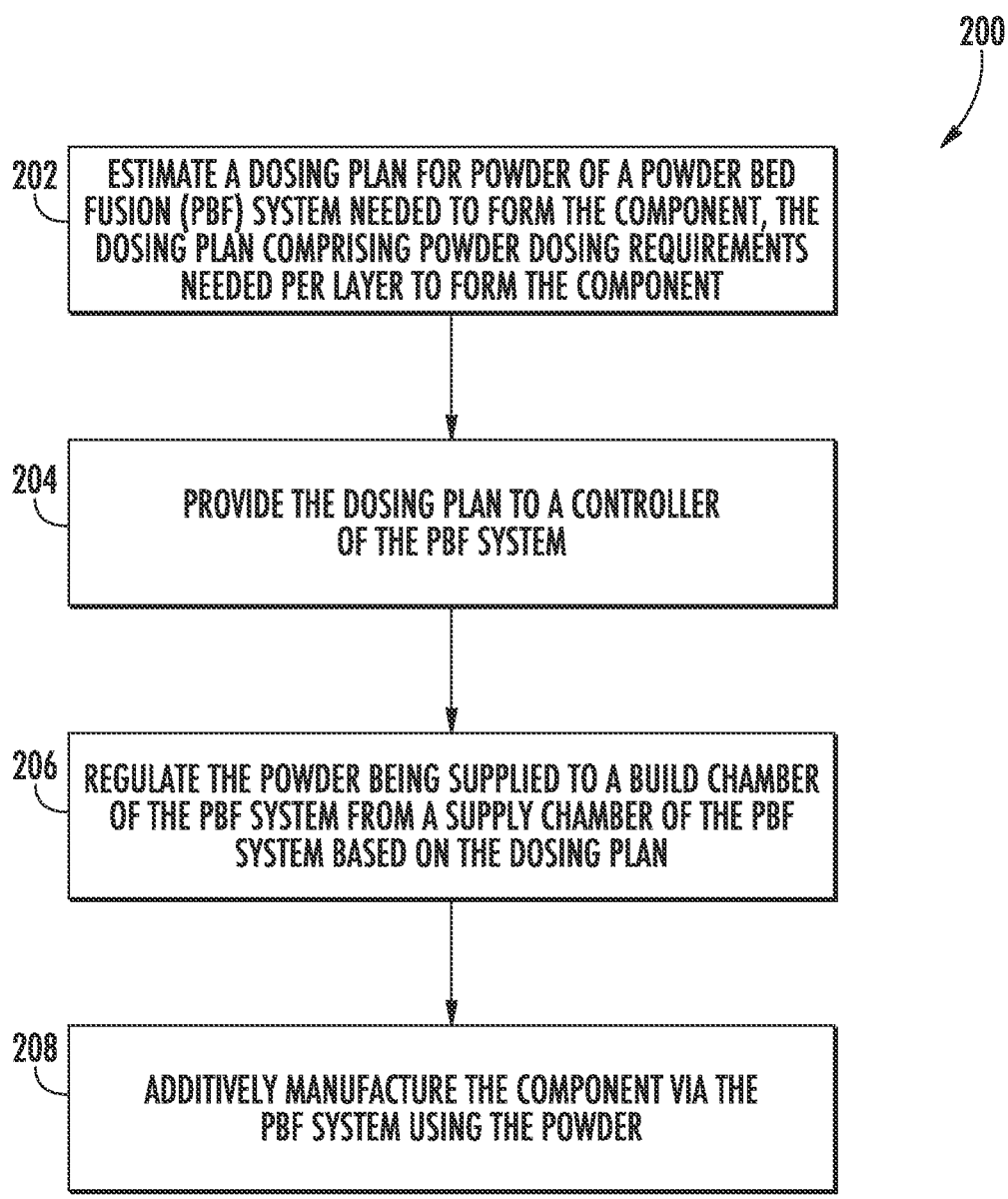
FIG. 4 illustrates a flow chart of one embodiment of a method for additively manufacturing a component according to the present disclosure.

Referring now to FIG. 4, a flow chart 200 of a method for forming a component, such as an aircraft component, according to the present disclosure is illustrated. In general, the method 200 will be described herein with reference to the component 108 and additive manufacturing system 100 of FIGS. 1 and 2. However, it should be appreciated that the disclosed method 200 may be implemented with additive manufacturing systems having any other suitable configurations. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 8:
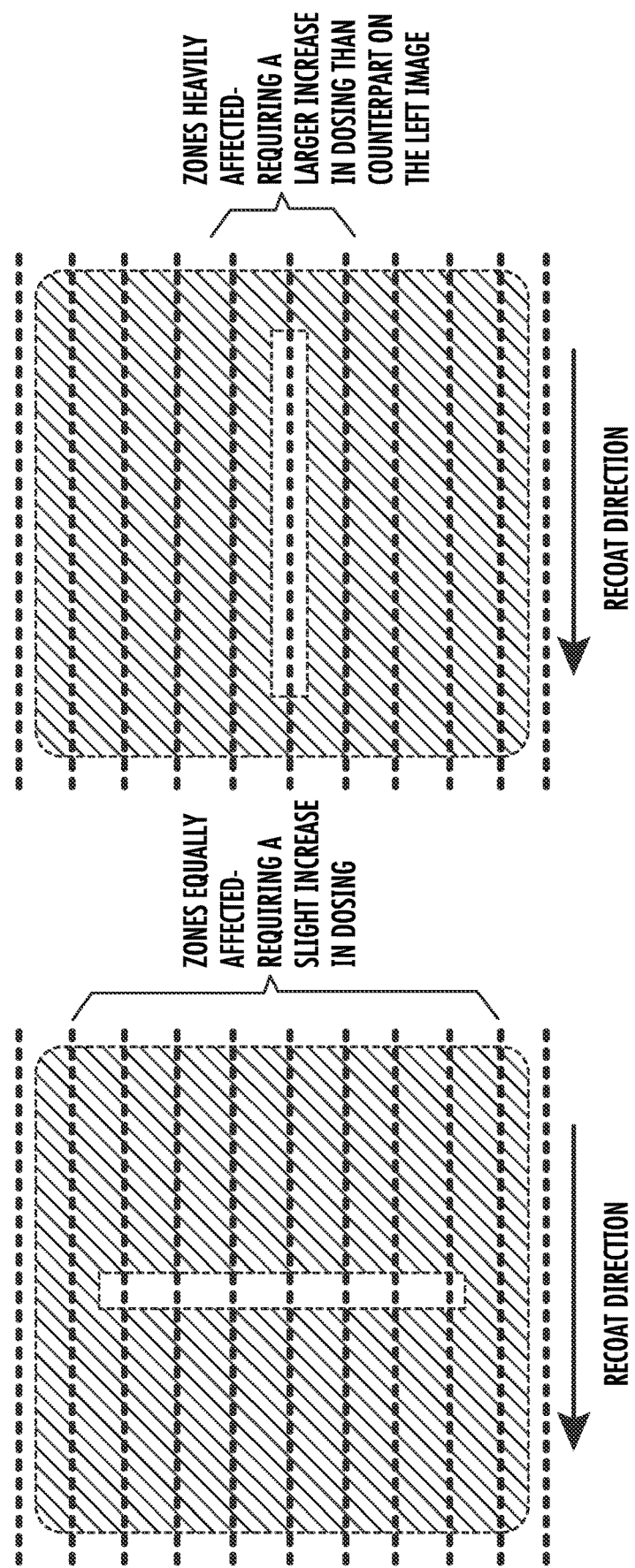
FIG. 8 illustrates a perspective view of one embodiment of a layer of a component formed via additive manufacturing according to the present disclosure.

As shown at (202), the method 200 may include estimating a dosing plan for powder of the PBF system 100 (such as a DMLM system described herein) needed to form the component. For example, the dosing plan may include powder dosing requirements needed per layer to form the component. In certain embodiments, the powder dosing requirements may be predetermined. For example, in an embodiment, prior to building the component, the controller 130 may estimate the dosing plan for the powder of the PBF system 100 by dividing an exposure area of the component into one or more zones, as shown via the dotted lines in FIG. 8. Such zone(s), as an example, may be associated with various parameters, such as a powder packing factor, a part orientation, a recoater contact, and/or build time productivity. For example, FIG. 8 particularly illustrates various zones being equally-impacted (left image) and heavily impacting (right image). Thus, the controller 130 can determine a variance of the exposure area across the one or more zones, e.g. via an algorithm stored in the controller 130. Further, the controller 130 can minimize the variance of the exposure area across the zone(s) so as to equalize a powder requirement across the build platform 118. Moreover, the algorithm can be combined with other system algorithms that rank the packing and orientation from the recoater contact, build time productivity, etc., to provide a holistic ranking for the packing and orientation.

Figure 7:
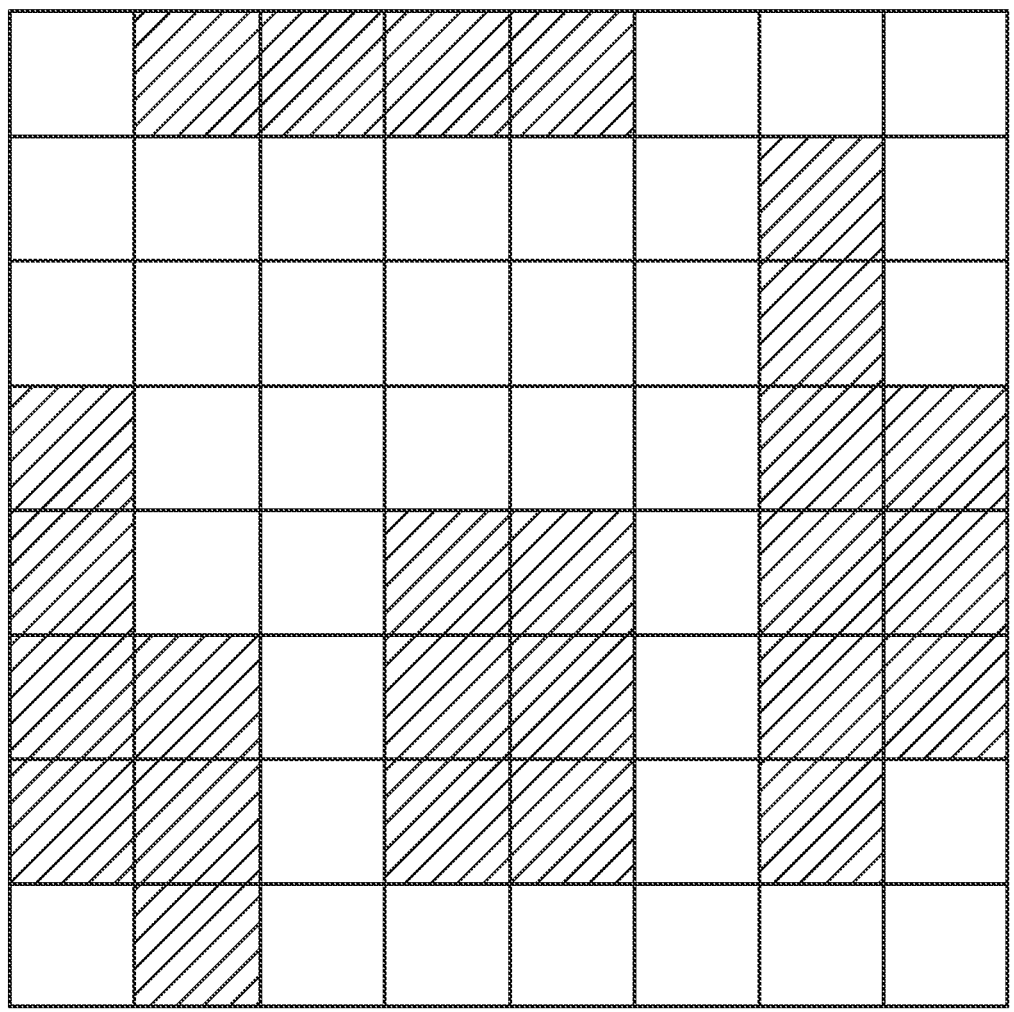
FIG. 7 illustrates a perspective view of one embodiment of a pixelated layer of a component formed via additive manufacturing according to the present disclosure.
Figure 7:

In another embodiment, as shown in FIG. 7 for example, the controller 130 may estimate the dosing plan for the powder of the PBF system 100 by receiving one or more inputs, e.g. relating to part geometry and a material type of the powder, calculating a shrinkage factor of the powder in a melted state, splitting the layers into a grid of pixels to determine which pixels require an amount of powder above a certain threshold and generating the dosing plan based on the shrink factor and the grid of pixels which may include an additional dosing factor to account for powder that may be lost to the areas surrounding the build box. For example, FIG. 7 illustrates a simplified pixel diagram of one layer of the component in which certain pixels need more powder (as represented via shaded boxes) than others (as represented by white boxes).

Figure 5:
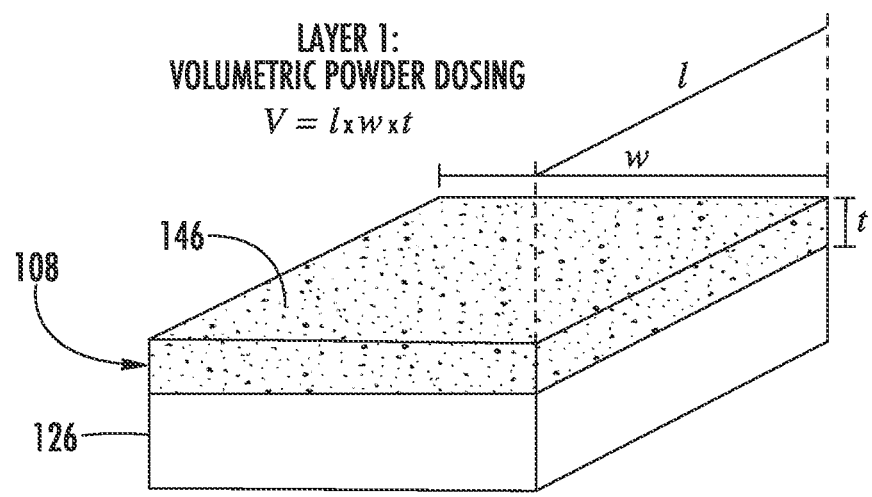
FIG. 5 illustrates a perspective view of one embodiment of a layer of a component formed via additive manufacturing according to the present disclosure.
Figure 6:
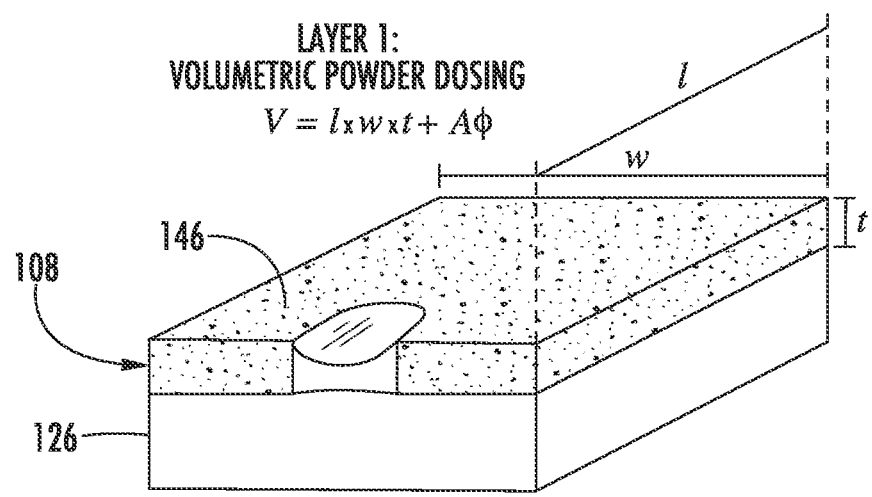
FIG. 6 illustrates a perspective view of another embodiment of a layer of a component formed via additive manufacturing according to the present disclosure.

In certain embodiments, as shown in FIGS. 5 and 6, for example, the dosing plan may be estimated by pre-determining a volume V of each layer of the component 108 (using the length l, width w, and the thickness t), determining a perimeter P of each layer of the component 108, and estimating the powder dosing requirements of the dosing plan as a function of the volume V and the perimeter P.

In addition or in the alternative, the method 100 may include updating the powder dosing requirements in real-time as a function of geometry of the component 108.

More specifically, as shown in FIG. 6, the dosing plan may be estimated by adding an additional powder margin A to the powder dosing requirements of the dosing plan. In such embodiments, the additional powder margin AΦ may account for an area around and between the build platform 126 and the supply chamber 102 or the overflow collector 132 of the PBF system 100. In addition or in the alternative, the additional powder margin AΦ may account for melted powder having a lesser volume than powder particles.

In another embodiment, the method 200 may include determining at least one of a shrinkage factor or a compaction level for the powder based on a powder type and estimating the powder dosing requirements of the dosing plan as a function of the shrinkage factor and/or the compaction level.

Referring back to FIG. 4, as shown at (204), the method 200 may include providing the dosing plan to a controller of the PBF system 100. As shown at (206), the method 200 may include regulating the powder being supplied to the build chamber 106 of the PBF system 100 from the supply chamber 102 based on the dosing plan. In several embodiments, the method 200 may include automating, via the controller 130 of the PBF system 100, dosing level changes layer-by-layer. Referring still to FIG. 3, as shown at (208), the method 200 may include additively manufacturing the component 108 onto the build platform 118 via the PBF system 100 using the powder 104 in the build chamber.

Various aspects and embodiments of the present invention are defined by the following numbered clauses:

Clause 1. A method for forming a component, the method comprising: estimating a dosing plan for powder of a powder bed fusion (PBF) system needed to form the component, the dosing plan comprising powder dosing requirements needed per layer to form the component;
providing the dosing plan to a controller of the PBF system;
regulating the powder being supplied to a build chamber of the PBF system from a supply chamber of the PBF system based on the dosing plan; and
additively manufacturing the component onto a build platform via the PBF system using the powder in the build chamber.

Clause 2. The method of clause 1, wherein estimating the dosing plan for the powder of the PBF system needed to form the component further comprises:
determining a volume of each layer of the component;
determining a perimeter of each layer of the component; and
estimating the powder dosing requirements of the dosing plan as a function of the volume and the perimeter.

Clause 3. The method of clauses 1-2, further comprising:
determining at least one of a shrinkage factor or a compaction level for the powder based on a powder type; and
estimating the powder dosing requirements of the dosing plan as a function of at least one of the shrinkage factor or the compaction level.

Clause 4. The method of any of the preceding clauses, wherein estimating the dosing plan for powder of the PBF system further comprises:
dividing an exposure area of the component into one or more zones, the one or more zones being associated with one or more of a powder packing factor, a part orientation, a recoater contact, or build time productivity;
determining, via an algorithm stored in the controller of the PBF system a variance of the exposure area across the one or more zones; and
minimizing the variance of the exposure area across the one or more zones so as to equalize a powder requirement across the build platform.

Clause 5. The method of any of the preceding clauses, wherein estimating the dosing plan for powder of the PBF system further comprises:
receiving, via the controller, one or more inputs relating to slice files and a material type of the powder;
calculating, via the controller, a shrinkage factor of the powder in a melted state;
splitting, via the controller, the one or more slice files into a grid of pixels to determine which pixels require an amount of powder above a certain threshold;
generating, via the controller, the dosing plan based on the shrink factor and the grid of pixels.

Clause 6. The method of any of the preceding clauses, wherein estimating the dosing plan for the powder of the PBF system needed to form the component further comprises:
adding an additional powder margin to the powder dosing requirements of the dosing plan to account for an area between the build platform and at least one of the supply chamber or an overflow collector of the PBF system.

Clause 7. The method of any of the preceding clauses, wherein estimating the dosing plan for the powder of the PBF system needed to form the component further comprises:
adding an additional powder margin to the powder dosing requirements of the dosing plan to account for melted powder having a lesser volume than powder particles.

Clause 8. The method of any of the preceding clauses, further comprising automating, via the controller of the PBF system, dosing level changes layer-by-layer.

Clause 9. The method of any of the preceding clauses, wherein the PBF system comprises a direct metal laser melting (DMLM) system.

Clause 10. The method of any of the preceding clauses, wherein the component is an aircraft component.

Clause 11. A powder bed fusion (PBF) system for forming a component, the PBF system comprising:
- a build chamber comprising a build platform;
- a recoater;
- a supply chamber configured to receive an amount of powder based on the component to be formed, the supply chamber comprising a supply platform, wherein, as the supply platform elevates, the powder is forced out of the supply chamber layer-by-layer and into the build chamber atop the build platform via the recoater;
- an energy source comprising an energy beam that is directed onto the powder in the build chamber to melt or fuse sequential layers of powder together to form the component; and
- a controller for estimating a dosing plan for the powder needed to form the component and regulating the powder being supplied to the build chamber from the supply chamber of the PBF system based on the dosing plan, the dosing plan comprising powder dosing requirements needed per layer to form the component.

Clause 12. The PBF system of clause 11, further comprising an overflow collector for collecting excess powder from the build chamber, the recoater moveable across the supply chamber, the build chamber, and the overflow collector to move the excess powder to the overflow collector.

Clause 13. The PBF system of clauses 11-12, wherein the energy beam comprises at least one of a laser or an electron beam.

Clause 14. The PBF system of clauses 11-13, wherein estimating the dosing plan for the powder needed to form the component further comprises:
- determining a perimeter of each layer of the component; and
- estimating the powder dosing requirements of the dosing plan as a function of the volume and the perimeter.

Clause 15. The PBF system of clauses 11-14, wherein the controller is further configured to:
- determine at least one of a shrinkage factor or a compaction level for the powder based on a powder type; and
- estimate the powder dosing requirements of the dosing plan as a function of at least one of the shrinkage factor or the compaction level.

Clause 16. The PBF system of clauses 11-15, wherein estimating the dosing plan for powder of the PBF system further comprises:
- dividing an exposure area of the component into one or more zones, the one or more zones being associated with one or more of a powder packing factor, a part orientation, a recoater contact, or build time productivity;
- determining, via an algorithm stored in the controller of the PBF system a variance of the exposure area across the one or more zones; and
- minimizing the variance of the exposure area across the one or more zones so as to equalize a powder requirement across the build platform.

Clause 17. The PBF system of clauses 11-16, wherein estimating the dosing plan for powder of the PBF system further comprises:
- receiving, via the controller, one or more inputs relating to slice files and a material type of the powder;
- calculating, via the controller, a shrinkage factor of the powder in a melted state;
- splitting, via the controller, the one or more slice files into a grid of pixels to determine which pixels require an amount of powder above a certain threshold;
- generating, via the controller, the dosing plan based on the shrink factor and the grid of pixels.

Clause 18. The PBF system of clauses 11-17, wherein the controller is further configured to estimate the dosing plan for the powder of the PBF system needed to form the component by:
- adding an additional powder margin to the powder dosing requirements of the dosing plan to account for an area between the build platform and at least one of the supply chamber or an overflow collector of the PBF system.

Clause 19. The PBF system of clauses 11-18, wherein the controller is further configured to estimate the dosing plan for the powder of the PBF system needed to form the component by:
- adding an additional powder margin to the powder dosing requirements of the dosing plan to account for melted powder having a lesser volume than powder particles.

Clause 20. The PBF system of clauses 11-19, wherein the controller of the PBF system automates dosing level changes layer-by-layer.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A powder bed fusion (PBF) system for forming a component, the PBF system comprising:
   - a build chamber comprising a build platform;
   - a recoater;
   - a supply chamber configured to receive an amount of powder based on the component to be formed, the supply chamber comprising a supply platform, wherein, as the supply platform elevates, the powder is forced out of the supply chamber layer-by-layer and into the build chamber atop the build platform via the recoater;
   - an energy source comprising an energy beam that is directed onto the powder in the build chamber to melt or fuse sequential layers of powder together to form the component; and
   - a controller for estimating a dosing plan for the powder needed to form the component and regulating the powder being supplied to the build chamber from the supply chamber of the PBF system based on the dosing plan, the dosing plan comprising powder dosing requirements needed per layer to form the component.

2. The PBF system of claim 1, further comprising an overflow collector for collecting excess powder from the build chamber, the recoater moveable across the supply chamber, the build chamber, and the overflow collector to move the excess powder to the overflow collector.

3. The PBF system of claim 1, wherein the energy beam comprises at least one of a laser or an electron beam.

4. The PBF system of claim 1, wherein estimating the dosing plan for the powder needed to form the component further comprises:
determining a volume of each layer of the component;
determining a perimeter of each layer of the component; and
estimating the powder dosing requirements of the dosing plan as a function of the volume and the perimeter.

5. The PBF system of claim 4, wherein the controller is further configured to:
determine at least one of a shrinkage factor or a compaction level for the powder based on a powder type; and
estimate the powder dosing requirements of the dosing plan as a function of at least one of the shrinkage factor or the compaction level.

6. The PBF system of claim 2, wherein estimating the dosing plan for powder of the PBF system further comprises:
dividing an exposure area of the component into one or more zones, the one or more zones being associated with one or more of a powder packing factor, a part orientation, a recoater contact, or build time productivity;
determining, via an algorithm stored in the controller of the PBF system a variance of the exposure area across the one or more zones; and
minimizing the variance of the exposure area across the one or more zones so as to equalize a powder requirement across the build platform.

7. The PBF system of claim 1, wherein estimating the dosing plan for powder of the PBF system further comprises:
receiving, via the controller, one or more inputs relating to slice files and a material type of the powder;
calculating, via the controller, a shrinkage factor of the powder in a melted state;
splitting, via the controller, the slice files into a grid of pixels to determine which pixels require an amount of powder above a certain threshold;
generating, via the controller, the dosing plan based on the shrink factor and the grid of pixels.

8. The PBF system of claim 2, wherein the controller is further configured to estimate the dosing plan for the powder of the PBF system needed to form the component by:
adding an additional powder margin to the powder dosing requirements of the dosing plan to account for an area between the build platform and at least one of the supply chamber or an overflow collector of the PBF system.

9. The PBF system of claim 1, wherein the controller is further configured to estimate the dosing plan for the powder of the PBF system needed to form the component by:
adding an additional powder margin to the powder dosing requirements of the dosing plan to account for melted powder having a lesser volume than powder particles.

10. The PBF system of claim 1, wherein the controller of the PBF system automates dosing level changes layer-by-layer.

11. The PBF system of claim 1, wherein the PBF system comprises a direct metal laser melting (DMLM) system.

12. The PBF system of claim 1, wherein the component is an aircraft component.

13. The PBF system of claim 12, wherein the aircraft component is a gas turbine engine, an airfoil separator, or a heat exchanger.

14. The PBF system of claim 1, wherein the powder comprises a metal, a metal alloy, a plastic, a ceramic, a composition, or a combination thereof.

15. The PBF system of claim 14, wherein the powder comprises a metal or metal alloy, the metal or metal alloy comprising tungsten, aluminum, chromium, copper, cobalt, molybdenum, tantalum, titanium, nickel, steel, or a combination thereof.

16. The PBF system of claim 1, wherein the PBF system further comprises a scanner communicatively coupled with the controller for controlling a path of the energy beam.

17. The PBF system of claim 1, wherein the supply chamber includes a powder piston that elevates a powder floor.

18. The PBF system of claim 1, wherein the recoater is a roller or blade.

19. The PBF system of claim 1, wherein the recoater sequentially distributes layers of powder onto the build platform.

20. The PBF system of claim 1, wherein the PBF system comprises an electron beam melting (EBM) system, a selective laser melting (SLM) system, a directed metal laser sintering (DMLS) system, or a selective laser sintering (SLS) system.

* * * * *